United States Patent [19]

Weyer

[11] Patent Number: 4,738,415
[45] Date of Patent: Apr. 19, 1988

[54] HINGE LINE FLIGHT ACTUATOR

[76] Inventor: Paul P. Weyer, 48811 128th Ave. SE., Enumclaw, Wash. 98022

[21] Appl. No.: 920,564

[22] Filed: Oct. 17, 1986

[51] Int. Cl.$^4$ ............................................. B64C 13/36
[52] U.S. Cl. ...................................... 244/78; 244/213; 92/31; 92/140; 92/76; 74/99 R; 74/107; 74/89.15; 74/424.8 R
[58] Field of Search .................... 92/31, 33, 116, 140, 92/61, 76; 74/99 R, 107, 89.15, 424.8 R; 244/78, 213

[56] References Cited

U.S. PATENT DOCUMENTS

| | | | |
|---|---|---|---|
| 3,162,098 | 12/1964 | Lindberg | 92/33 |
| 4,134,329 | 1/1979 | Belliere | 92/70 |
| 4,590,816 | 5/1986 | Weyer | 92/33 |
| 4,691,582 | 9/1987 | Weyer | 72/424.8 |

Primary Examiner—Robert E. Garrett
Assistant Examiner—Thomas E. Denion
Attorney, Agent, or Firm—Seed and Berry

[57] ABSTRACT

A fluid-powered rotary actuator particularly well suited for use in operating an aircraft flight control surface. The body has a stationary body portion and a rotatable body portion with an elongated annular sleeve reciprocally and coaxially mounted within the body. A tie-rod coaxially projects through the sleeve from end-to-end between the stationary and rotatable body portions to maintain their relative longitudinal position against axial separation during actuator operation. To each axially outward side of the sleeve is an annular ball deflector. The axially outward portions of the sleeve and the corresponding portions of the stationary and rotatable body portions have helical ball races formed therein to transmit torque between the body portions and the sleeve to cause the rotatable body portion to rotate in response to fluid-powered linear reciprocation of the sleeve. The sleeve further includes a radially recessed intermediate portion with an intermediate ball race which connects together the ball races of the axially outward sleeve portions. A recirculation ball race is positioned radially inward from the outward sleeve ball races and serves to channel balls between the deflectors. In combination, the ball races form six endless ball circuits. A piston is mounted on each of the two mounting portions of the sleeve extending longitudinally outward from each axially outward end of the sleeve.

36 Claims, 4 Drawing Sheets

HINGE LINE FLIGHT ACTUATOR

DESCRIPTION

1. Technical Field

The present invention relates generally to actuators, and more particularly, to fluid-powered actuators of the type in which axial movement of a piston produces relative movement between two exterior body portions. The present invention is particularly well suited for use in aircraft to operate flight control surfaces.

2. Background of the Invention

Rotary helically splined actuators have been employed in the past to achieve the advantages of high-torque output from a simple linear piston-and-cylinder drive arrangement. For high-torque, high-efficiency applications, the splined helical actuators have been found to have an undesirably high frictional coefficient. While actuators have been constructed using balls and helical ball races, and provide a higher output efficiency due to the rolling friction of balls being less than the sliding friction of splines, these actuators are generally not well suited for use in certain applications, such as for an aircraft flight control actuator, which requires a lightweight and thin profile construction, while at the same time a high-torque output.

When used as the power means to rotate an aircraft flight control surface, particularly with state of the art and future generation high performance aircraft, the forces encountered by the control surface are large, and hence require the actuator to have an extremely high-torque output. At the same time, weight limitations are severe and the space available is limited. Furthermore, since minimal turbulence is tolerated, it is desirable to use no external hinges or levers, and to have the actuator fit within the cross-sectional size envelope of the flight surfaces with which the actuator is being used.

Size is particularly a problem with current designs for thin winged aircraft where the interior space adjacent to the wing control surface, within which the actuator must fit, may require an actuator with a cross-sectional size of no more than 2.25 inches, while producing a torque output in excess of 22,000 inch-lbs. This must be accomplished using a construction material which has sufficient strength to handle the high-fluid pressures and torque outputs involved, such as steel, while adding the least weight possible to the aircraft, preferably under 20 lbs.

Another problem concerns the effects of the wing flexing during turbulence. A rigid actuator construction puts great strain on its points of attachment to the wing, and if the actuator is allowed to flex with the wing, binding forces can be created within the actuator which affects its operation.

It is desirable to provide an actuator that avoids these problems, and that meets the design criteria and provides the benefits noted above. The present invention fulfills these needs and further provides other related advantages.

2. Disclosure of the Invention

The present invention resides in a fluid-powered rotary actuator. The actuator is particularly useful in aircraft to operate a flight control surface. The actuator has an outer elongated body having first and second ends and a mid-portion therebetween. The body has an elongated interior cavity extending generally between the first and second body ends. The body includes a stationary first end body portion extending from the first end to the body mid-portion and terminating thereat in an inward end portion, and a second end body portion rotatable relative to the stationary first body portion and extending from the second end to the mid-portion and terminating in an inward end portion. The first and second body portions are in generally coaxial longitudinal alignment, and the inward end portions of the first and second body portions are positioned in generally end-to-end relationship for rotation relative to each other. The body portions each have an interior cavity therewithin forming a portion of the body cavity.

The first body portion has torque-transmitting interior first grooves, and the second body portion has torque-transmitting interior second grooves. In the preferred embodiment, the first grooves include a torque-transmitting interior first helical ball race with one hand turn, and the second grooves include a torque-transmitting interior second helical ball race with an opposite hand turn, with the ball races having the same lead angle.

The body further includes exterior attachment arms, each rigidly connected to one of the first or second body portions. The one attachment arm is connected to the first body portion at the inward end portion thereof for attachment to a stationary structure, such as the aircraft structure, or to a movable member, such as the aircraft flight control surface. The other exterior attachment arm is connected to the second body portion at the inward end portion thereof for attachment to the other of the stationary structure or the movable member, thus minimizing the axial separation between the attachment arms.

The actuator further includes an elongated annular sleeve reciprocally and generally coaxially mounted within the body cavity, and having a longitudinal aperture extending fully therethrough. The sleeve has a first end sleeve portion positioned within the first cavity of the first body portion, a second end sleeve portion positioned within the second cavity of the second body portion, and an intermediate sleeve portion extending between the first and second sleeve portions and spanning the inward end portions of the first and second body portions. The first sleeve portion extends from an axially outward portion thereof located toward the first body end to the intermediate sleeve portion, and the second sleeve portion extends from an axially outward portion thereof located toward the second body to the intermediate sleeve portion.

The first sleeve portion has a torque-transmitting exterior first helical ball race confronting and corresponding to the interior first ball race of the first body portion. The second sleeve portion has a torque-transmitting exterior second helical ball race confronting and corresponding to the interior second ball race of the second body portion. The intermediate sleeve portion has a sufficient longitudinal length to permit free end-to-end reciprocation of the sleeve within the body while the sleeve portion exterior first and second ball races coact with the body portion interior first and second ball races during actuator operation.

The exterior first ball race of the first sleeve portion extend from an outward race end thereof located toward the first sleeve portion outward portion to an inward race end located adjacent to the intermediate sleeve portion. The exterior second ball race of the second sleeve portion extends from an outward race end thereof located toward the second sleeve portion outward portion to an inward race end located adjacent to the intermediate sleeve portion. The intermediate sleeve portion has an intermediate ball race extending between and connecting together the inward race ends of the sleeve portion exterior first and second ball races for the passage of balls between the sleeve portion exterior first and second ball races during actuator operation. The intermediate sleeve portion is positioned radially inward from the body to maintain the balls in the intermediate ball race out of torque-transmitting engagement with the body.

The sleeve further includes a recirculation ball race generally longitudinally extending between an outward race end located toward the first sleeve portion outward portion and an outward race end located toward the second sleeve portion outward portion. The recirculation ball race is positioned radially inward of the sleeve portion exterior first and second ball races. In the preferred embodiment, the recirculation ball race extends interiorly within the sleeve wall of the sleeve for at least a portion of its length coextensive with the first and second body portions.

The actuator has first and second ball deflectors positioned at the first and second sleeve portion outward portions, respectively. The deflectors have deflector ball races extending between and connecting together the outward race ends of the first and second sleeve portion exterior first and second ball races with the recirculation ball race for the passage of balls therebetween during actuator operation. The first and second sleeve portion exterior first and second ball races, the intermediate sleeve portion intermediate ball race, the sleeve recirculation ball race and the first and second deflector ball races define an endless ball circuit for ball circulation during actuator operation.

A plurality of balls are seated in the endless ball circuit to define an endless train of balls. Preferably, the balls substantially fill the endless ball circuit.

A piston is reciprocally and generally coaxially mounted within the body cavity for application of fluid pressure thereon. The piston operatively engages the sleeve to produce reciprocal axial movement of the sleeve. The piston has a longitudinal aperture extending fully therethrough.

The actuator further includes a connector member disposed within the body and extending through the apertures of the sleeve and piston. The connector member and the sleeve and piston apertures are radially sized to permit movement of the sleeve and piston substantially uninhibited along the connecting member. The connecting member extends between and is connected to each of the first and second end body portions to connect together and maintain fixed the relative longitudinal positions of the first and second body portions against axial separation during actuator operation.

In the preferred embodiment, the connector member includes a tie-rod disposed within the body and extending end-to-end between a pair of end members positioned at the body first and second ends. The first and second end members engaged the first and second body portions and apply through the tie-rod an axially inward force on the first and second body portions to maintain the relative longitudinal positions thereof.

At least a centrally located lengthwise portion of the intermediate ball race is an open ball race formed in the exterior of the recessed intermediate sleeve portion. At least a lengthwise portion of the recirculation ball race coextensive with the recessed intermediate sleeve portion is also an open ball race formed in the exterior of the recessed intermediate sleeve portion. A cover is positioned within the body cavity and extends about the recessed interemdiate sleeve portion radially outward of the balls in the open ball race lengthwise portions of the intermediate and recirculation ball races to maintain the balls in position within the open ball races during actuator operation.

The intermediate ball race includes a ramped ball race portion at each outward end of the open ball race portion of the intermediate ball race to guide balls between the open ball race portion and the exterior first and second ball races of the first and second sleeve portions. The ramped ball race portions are tunnels formed in the first and second sleeve portions.

In the preferred embodiment, the ball deflectors are annular members generally coaxially mounted within the body cavity, each axially outward of one of the sleeve outward portions. The annular members are attached to the sleeve to prevent the relative rotation therebetween, and each has an end face with one of the deflector ball races formed therein. Each end face is in juxtaposition with an axially outward end face of the corresponding sleeve portion. The deflectors are held in position by a piston sleeve portion of the piston which is attached to a piston mounting portion of the sleeve extending longitudinally beyond the axially outward portion of the corresponding first or second sleeve portion.

Other features and advantages of the invention will become apparent from the following detailed description, taken in conjunction with the accompanying drawing.

BEST MODE FOR CARRYING OUT THE INVENTION

Figure 1:
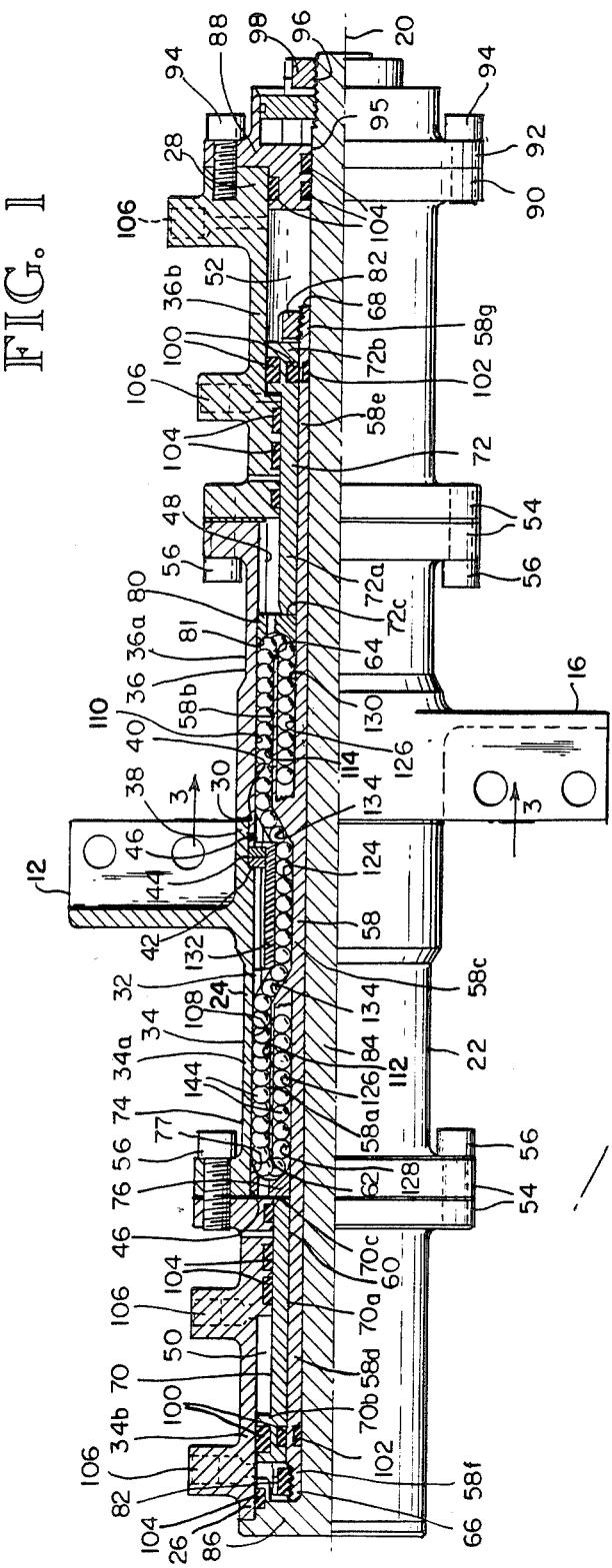
FIG. 1 is a side elevational, sectional view of a fluid-powered rotary actuator embodying the present invention.

As shown in the drawings for purposes of illustration, the present invention is embodied in a fluid-powered rotary actuator, indicated generally by reference numeral 10.

Figure 2:
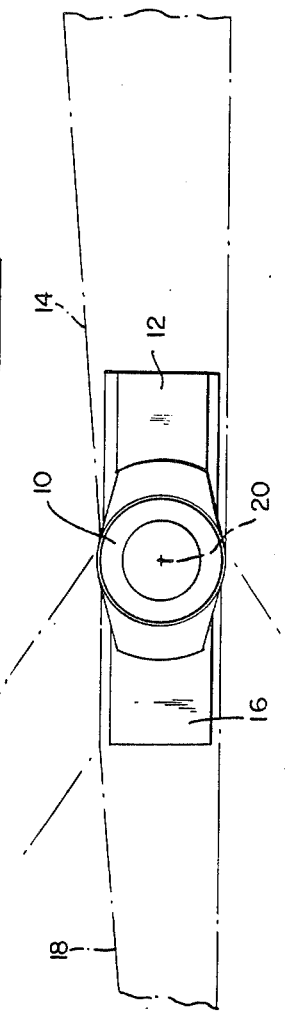
FIG. 2 is an end view of the actuator of FIG. 1 shown installed in an aircraft with the aircraft wing structure and the aircraft flight control surface shown in phantom.

The rotary actuator 10 of the present invention is shown in FIG. 2 installed in an aircraft. A stationary bracket 12 is provided for attachment to the interior structure of a wing 14, and a rotatable bracket 16 is mounted within the interior of a flight control surface 18, such as a wing flap. The actuator is particularly well suited for high-performance aircraft requiring a thin profile with the actuator points of attachment located interior of the wing and control surface without any protruding hinges or levers so as to minimize turbulence and drag. The actuator 10 has a design which allows the placement of the attachment brackets 12 and 16 closely together with little axial separation to reduce the amount of movement therebetween should the actuator bend under the forces applied by the wings flexing. Additionally, the design is well suited to operate without binding when so bent.

In the embodiments of the invention shown in the drawings, it has also been possible to produce a ball screw fluid-powered actuator with a cross-sectional thickness of 2.25 inches at its thickest point so that it fits within the cross-sectional size envelope for the wing, and yet produces torque in excess of 22,000 inch-lbs. The actuator has the strength to handle fluid pressures of 8,000 psi using an all-steel construction, and yet weighs only about 19 lbs. Moreover, the actuator has a design which allows it to operate without binding even under wing flex conditions producing relatively large bending forces on the actuator which cause bending in the actuator, such as encountered during turbulence. The actuator uses a construction which allows wing flexing, and hence does not require a wing mounting without wing flex or put undue stress on the wing at the points of attachment when flex is encountered.

The actuator 10 has a generally symmetrical construction about a longitudinal central axis 20 of operation, and as will be described in more detail below, the torque-transmitting components have a concentric design about the actuator longitudinal central axis.

The actuator is particularly well suited for use as a hinge line actuator to operate an aircraft flight control surface, that is, with its longitudinal central axis of operation coaxial with the axis of rotation of the flight control surface.

In a first embodiment shown in FIGS. 1–7, and as best shown in FIG. 1, the actuator 10 includes an outer elongated body 22 having a cyclindrical sidewall 24 with an axially outward first end 26 and a second end 28, and having a mid-portion 30 centrally positioned therebetween. The body 22 has an elongated cylindrical interior cavity 32 extending between the first and second ends 26 and 28.

The body 22 is comprised of an elongated stationary first end body portion 34, and an elongated second end body portion 36 supported for rotation relative to the first body portion. The first body portion extends from the first end 26 to the body mid-portion 30, and terminates thereat in an inward end portion 38. Similarly, the second body portion 36 extends from the second end 28 to the mid-portion 30, and terminates thereat in an inward end portion 40. The first and second body portions 34 and 36 are in coaxial longitudinal alignment with the inward end portions of the first and second body portions being positioned in generally end-to-end relationship for rotation relative to each other.

The inward end portion 38 of the first body portion 34 has an interior, circumferentially extending stop shoulder 42 formed therein, and has a radial size sufficient to receive therewithin against the stop shoulder the inward end portion 40 of the second body portion 36. A pair of split thrust bearings 44 are positioned against the stop shoulder 42 between the stop shoulder and the second body portion inward end portion 40 to facilitate relative rotation between the first and second body portions 34 and 36 during fluid-powered operation of the actuator 10. A conventional seal 46 is provided between the first and second body portion inward end portions 38 and 40 to prevent fluid leakage therebetween.

The first body portion 36 has an interior cylindrical first end cavity 46 therewithin forming a portion of the body cavity 32, and the second body portion has an interior cylindrical second end cavity 48 therewithin forming a portion of the body cavity. In the embodiments in the invention shown, the first and second body portions 34 and 36 each have a centrally located portion 34a and 36a, respectively, with the centrally located portions being positioned adjacent to each other, and an axially outward piston chamber portion 34b and 36b, respectively. The piston chamber body portions 34b and 36b defined therewithin an axially outward portion of each of the first and second cavities 46 and 48 which serve as fluid-type compartments 50 and 52 for the application of fluid pressure to operate the actuator.

The piston chamber portions 34b and 36b of the first and second body portions 34 and 36 in the presently preferred embodiment of the invention are manufactured as separate units and fixedly attached to the centrally located portions 34a and 34b. The piston chamber portions 34b and 36b and the centrally located portions 34a and 34b of the first and second body portions 34 and 36 each have a mating connector flange 54 by which the piston chamber portions are attached to the centrally located portions using a plurality of threaded fasteners 56. In alternative embodiments not shown, the first and second body portions 34 and 36 can each be manufactured as an integral unit.

Figure 6:
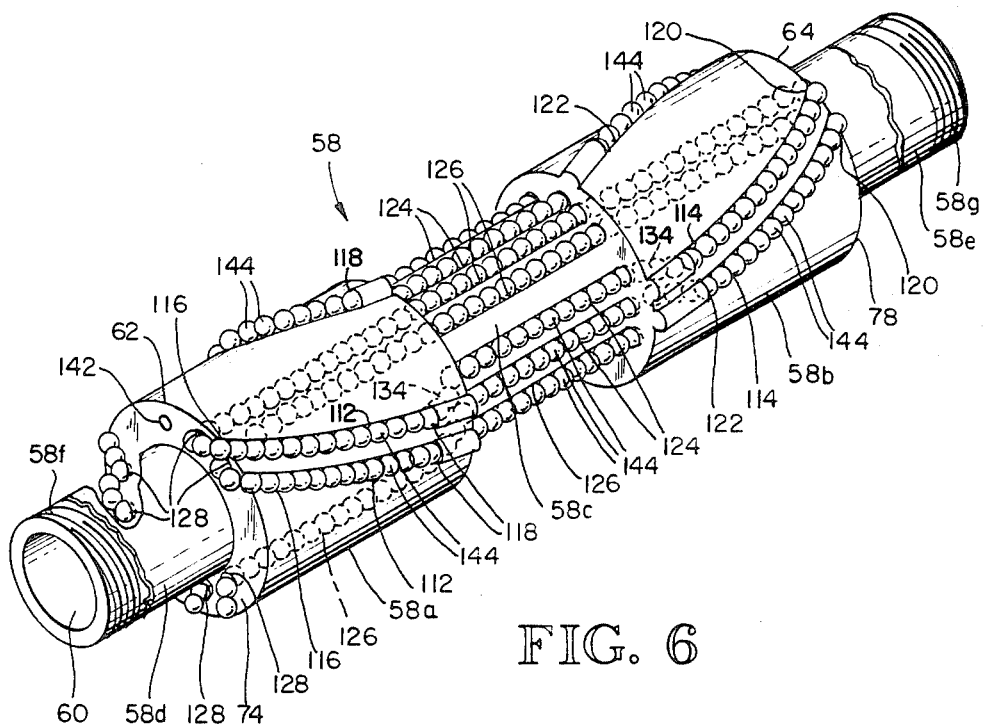
FIG. 6 is an isometric view of a sleeve used in the actuator of FIG. 1.

An elongated annular sleeve 58 is reciprocally and generally coaxially mounted within the body cavity 32 and has a longitudinal central aperture 60 extending fully therethrough. The sleeve 58 is best shown in FIG. 6 removed from the body cavity 32.

The sleeve 58 has a first end sleeve portion 58a which is positioned within the first cavity 46 of the first body 36, a second end sleeve portion 58b which is positioned within the second cavity 48 of the second body portion 38, and an intermediate sleeve portion 58c extending between the first and second sleeve portions and which spans the inward end portions 38 and 40 of the first and second body portions. The first sleeve portion 58a extends from an axially outward portion 62 thereof located toward the first body end 26 to the intermediate sleeve portion 58c, and the second sleeve portion 58b extends from an axially outward portion 46 thereof located toward the second body end 28 to the intermediate sleeve portion. The intermediate sleeve portion 58c has a reduced diameter to position its exterior surface radially inward of the exterior surfaces of the first and second sleeve portions 58a and 58b.

The sleeve 58 further includes a first piston mounting portion 58d extending from the axially outward portion 62 of the first sleeve portion 58a to an axially outward end 66 of the first mounting portion located toward the first body end 26, and a second piston mounting portion 58e extending from the axially outward portion 64 of the first sleeve portion 58b to an axially outward end portion 68 of the second mounting portion located toward the second body end 28. A first piston 70 having a piston sleeve portion 70a and an axially outward positioned annular piston head portion 70b formed integrally therewith is mounted coaxially on the sleeve mounting portion 58d. Similarly, a second piston 72 having a piston sleeve portion 72a and an axially outward positioned annular piston head portion 72b formed integrally therewith is mounted coaxially on the second sleeve mounting portion 58e.

Positioned between an axially inward end face 70c of the piston sleeve portion 70a of the first piston 70 and an axially outward end face 74 of the first sleeve portion 58a is a first annular ball deflector 76. Positioned between an axially inward end face 72c of the piston sleeve portion 72a of the piston 72 and an axially outward end face 78 of the second sleeve portion 58b is a second annular ball deflector 80. As will be described in more detail below, the ball deflectors 76 and 80 guide balls used to transmit torque and an approximately 180° turn upon reaching the outward portions 62 and 64 of the first and second sleeve portions. The first and second sleeve mounting portions 58d and 58e extend longitudinally outward beyond the first and second pistons 70 and 72, and each have a threaded end portion 58f and 58g, respectively, on which a retainer nut 82 is threadably mounted to engage the corresponding piston head portion 70b and 72b of the first and second pistons.

With an axially inward end face 77 of the first ball deflector 76 in juxtaposition with the outward end face 74 of the first sleeve portion 58a and in engagement therewith, and with the piston 70 in position with the inward face 70c of the piston sleeve portion 70a in engagement with the first ball deflector, tightening of the retainer nut 82 on the threaded end portion 58f of the sleeve 58 applies an axially inward force on the piston head portion 70b. This force is transmitted through the piston sleeve portion 70a to the first ball deflector 76 to maintain fixed the longitudinal positions of the piston 70 and the first ball deflector relative to the sleeve 58 during actuator operation. Similarly, the piston 72 is mounted on the mounting sleeve portion 58e with an axially inward end face 81 of the second ball deflector 80 in juxtaposition with the outward end face 78 of the second sleeve portion 58b, to apply an axially inward force on the piston 72 and the second ball deflector to maintain fixed the longitudinal positions of the piston 72 and second ball deflector relative to the sleeve 58 during actuator operation.

A tie-rod 84 is generally coaxially disposed within the body 22 and extends through the central aperture 60 of the sleeve 58. The outside diameter of the tie-rod 84 and the inside diameter of the central aperture 60 of the sleeve are diametrically sized to permit movement of the sleeve substantially uninhibited along the tie-rod during actuator operation. The tie-rod 84 terminates at the first body end 26 in a flanged portion 86 which forms a first end cap for the first body portion 34. The tie-rod extends from the first body end 26 fully through the body cavity 32 to the second body end 28 whereat an end cap 88 for the second body portion 36 is positioned. The body 22 and the end cap 88 each has a mating connection flange 90 and 92, respectively, by which the end cap is held in position at the first body end 28 using a plurality of threaded fasteners 94. The end cap 88 has a central aperture 95 through which the tie-rod 84 extends. The tie-rod 84 terminates exterior of the end cap 88 in a threaded end portion 96.

A retaining nut 98 is threadably mounted on the tie-rod threaded end portion 96 outward of the end cap 88 and upon adjustment, causes the tie-rod to apply an axially inward force through the flanged portion 86 and the end cap 88 upon the first and second body ends 26 and 28, respectively, of the first and second body portions 34 and 36. This force is selected sufficient to maintain fixed the relative longitudinal positions of the first and second body portions 34 and 36 against axial outward separation during actuator operation under the extremely large fluid pressures with which the actuator is capable of operating. The coaxial position of the tie-rod 84 within the body 22 and the sleeve 58 allows it to apply a balanced, large inward force on the first and second body portions 34 and 36, with a minimum of weight increase, no increase in outer actuator thickness, and with a minimum impact on the piston size. The adjustment nut 98 can be selectively tightened prior to fluid-powered operation of the actuator 10 to apply an axially inward pre-loading force on the thrust bearings 44 to accommodate any body separation which might occur and relieve the pre-loading.

The axially outward piston chamber portions 34b and 36b define the fluid-type compartments 50 and 52, and as previously noted, the piston head portions 70b and 72b, respectively, of the piston 70 and 72 are disposed therein. The piston head portions 70b and 72b carry conventional inner and outer seals 100 disposed between the piston head portion and the corresponding smooth wall portions of the piston chamber portions 34b and 36b along which the piston head portions travel as the sleeve 58 reciprocates. The sleeve mounting portions 58d and 58e each carry a conventional inner-seal 102 disposed between the sleeve mounting portion and the smooth outer surface of the tie-rod 84 along which the sleeve 84 reciprocates during actuator operation. Conventional seals 104 are provided between the flanged portion 86 of the tie-rod 84 and the first body portion 34, between the end cap 88 and the second body portion 36, between the end cap 88 and the tie-rod 84, and between the body 22 to the inward side of each of the piston head portions 70b and 72b and the piston sleeve portions 70a and 72a to define the fluid-tight compartments 50 and 52 and for fluid-tight chambers to each side of the piston head portions 70b and 72b for the application of fluid pressure to the chambers to operate the actuator.

Reciprocation of the pistons 70 and 72 within the body 22 occurs when hydraulic fluid under pressure selectively enters through one or the other of a pair of ports 106 in the body sidewall 24 to each side of the piston head portions of 70b and 72b. The application of fluid pressure to the axially outward side of the piston head portion 70b and the axially inward side of the piston head portion 72b produces axial movement of the pistons 70 and 72, and hence the sleeve 58 toward the second body end 28. The application of fluid pressure to the axially inward side of the piston head portion 70b and the axially outward side of the piston head portion 72b produces axial movement of the pistons 70 and 72 toward the first body end 26. The actuator 10 produces relative rotational movement between the stationary first body portion 34 and the rotatable second body portion 36 through the conversion of the linear movement of the pistons 70 and 72 into rotational movement of the second body portion 36, as will be described in more detail below.

Six torque-transmitting first helical ball races 108 are formed on the interior of the centrally located portion 34a of the first body portion 34, and have a right hand turn. Six torque-transmitting second helical ball races 110 are formed on the interior of the centrally located portion 36a of the second body portion 36, and have a left hand turn. While having opposite hand turns, the first and second interior helical ball races 108 and 110 have the same lead angle and are circumferentially positioned with the same spacing between corresponding ball races. The exterior of the first sleeve portion 58a has formed therein six torque-transmitting first helical ball races 112 confronting and corresponding to the interior first ball races 108 of the first body portion 34, and having the same right hand turn and lead angle. The exterior of the second sleeve portion 58b has formed therein six torque-transmitting second helical ball races 114 confronting and corresponding to the interior second ball races 110 of the second body portion 36, and having the same left hand turn and lead angle.

As best shown in FIG. 6, the exterior first ball races 112 of the first sleeve portion 58a each extend from an outward race end 116 located at the first sleeve portion outward portion 62 to an inward race end 118 located adjacent to the intermediate sleeve portion 58c. The exterior second ball races 114 of the second sleeve portion 58b each extend from an outward race end 120 located toward the second sleeve portion outward portion 64 to an inward race end 122 located adjacent to the intermediate sleeve portion 58c. As will be described in more detail below, the body ball races in combination form six endless ball circuits, each extending over the length of the sleeve. The ball races are circumferentially distributed about the body and sleeve in adjacent pairs, and in the preferred embodiment, the six ball races are in three groups of two ball races each, with the groups being circumferentially spaced apart by 120°.

The outward surface of the intermediate sleeve portion 58c has formed therein six intermediate ball races 124 which each extend between and connect together corresponding ones of the inward race ends 118 and 122 of the first and second ball races 112 and 114 of the first and second sleeve portions 58a and 58b for the passage of balls therebetween during actuator operation. The intermediate sleeve portion 58c is positioned radially inward away from the body 22 a sufficient distance to maintain the balls in the intermediate ball race 124 out of torque-transmitting engagement with the body and the interior first and second ball races 108 and 110 of the first and second body portions 34 and 36. The intermediate sleeve portion 58c has sufficient longitudinal length to permit free end-to-end reciprocation of the sleeve 58 within the body 22 while the sleeve portion exterior first and second ball races 112 and 114 coact with the body portion interior first and second ball races 108 and 110 during actuator operation.

The sleeve 58 further has six recirculation ball races 126, each longitudinally extending between an outward race end 128 located in the end wall 74 of the first sleeve portion outward portion 62 and an outward race end 130 located in the end wall 78 of the second body portion outward portion 64. The recirculation ball races 126 are positioned radially inward from the sleeve portion exterior first and second ball races 112 and 114, and are each a substantially straight bore extending fully through and interiorly within the sleeve wall of the first and second sleeve portions 58a and 58b.

In the presently preferred embodiment of the invention, the recirculation ball races 126 are positioned radially inward at the same radial position as the intermediate ball races 124, and have a lengthwise portion which is an open ball race formed on the exterior of the recessed intermediate sleeve portion 58c. Similarly, a lengthwise portion of the intermediate ball races 124 are also open ball races formed on the exterior of the recessed intermediate sleeve portion. A cover 132 is positioned within the body cavity 32 and extends circumferentially about the recessed intermediate sleeve portion 58c radially outward of the balls in the open ball race lengthwise portions of the intermediate and recirculation ball races 124 and 126 to maintain the balls in position within the open ball race lengthwise portions during actuator operation. The cover 132 is formed of two split halves and is positioned interiorly of the cross-bearings 44.

Each of the intermediate ball races 124 has at its opposite axially outward ends a ramped ball race portion 134 to guide the balls between the open ball race lengthwise portion of the intermediate ball race and the corresponding first and second ball race 112 and 114 of the first and second sleeve portions 58a and 58b. The ramped ball race portions 134 are tunnels formed in the first and second sleeve portions 58a and 58b adjacent to the intermediate sleeve portion 58c, and accommodate the radial distance between the first and second sleeve portion ball races and the intermediate ball race. The portion of the first and second sleeve portions 58a and 58b immediately radially outward of each of the tunnels protrudes radially outward above the surface of the sleeve portions to provide a smooth capture of the balls, and passes freely through the first and second ball races 108 and 110 of the first and second body portions 34 and 36 as the sleeve 58 reciprocates.

Figure 4:
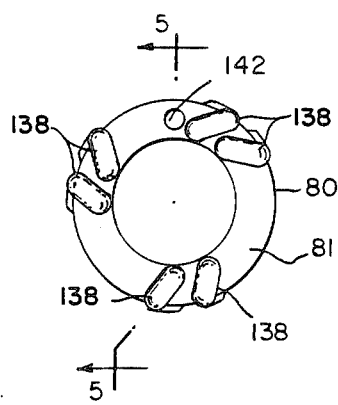
FIG. 4 is a front elevational view of an axially inward end face of an annular ball deflector of the type used in the actuator of FIG. 1.
Figure 5:
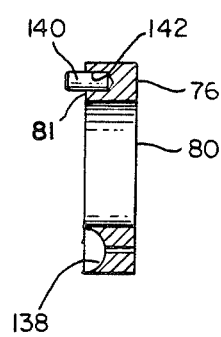
FIG. 5 is a sectional view taken substantially along the lines 5—5 of FIG. 4.

As previously described, the first and second ball deflectors 76 and 80 each has its axially inward end face 77 and 81 in juxtaposition with the axially outward end face 74 and 78 of the corresponding first and second sleeve portions 58a and 58b. Each ball deflector end face 77 and 81 has six deflector ball races 138 formed therein. For purposes of illustration, the second ball deflector 80 is shown in FIGS. 4 and 5 removed from the actuator.

The ball races 138 of the first ball deflector 76 extend between and connect together the corresponding outward race ends 116 of the first sleeve portion exterior first ball races 112 and the race ends 128 of the recirculation ball races 126 at the outward portion 62 of the first sleeve portion 58a for the passage of balls therebetween during actuator operation. Similarly, the ball races 138 of the second ball deflector 80 extend between and connect together the corresponding outward race ends 120 of the second sleeve portion exterior ball races 114 and the race ends 128 of the recirculation ball races 126 at the outward portion 64 of the second sleeve portion 58b for the passage of balls therebetween.

Each of the first and second ball deflectors 76 and 80 includes a dowel pin 140 which is disposed in a corresponding hole 142 in the ball deflector end face 77 and 81 in the end face 74 or 78 of the first and second sleeve portions 58a and 58b. The pins 140 prevent rotation of the deflectors 76 and 80 relative to the first and second sleeve portions 58a and 58b to keep the deflector ball races 138 in alignment with the corresponding ones of the outward race ends 116 and 120 of the first and second sleeve portion races 112 and 114 and the race ends 128 of the recirculation ball races 126. It is noted that the portion of the ball deflectors immediately radially outward of each of the deflector races protrudes radially outward above the edge wall of the deflector to provide for a smooth capture of the balls, and passes freely through the first and second ball races 108 and 110 of the first and second body portions 34 and 36 as the deflectors reciprocate with the sleeve 58.

Figure 3:
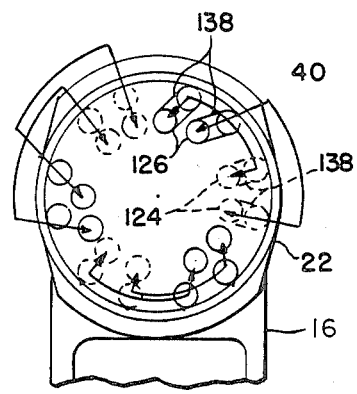
FIG. 3 is a sectional view taken substantially along the lines 3—3 of FIG. 1.

The first and second sleeve portion exterior first and second ball races 112 and 114, the intermediate sleeve portion intermediate ball races 124, the recirculation ball races 126, and the first and second deflector ball races 138 form in combination six endless ball circuits for ball circulation during actuator operation. One such ball circuit is shown in schematic form in FIG. 7 and is labeled to indicate the various portions of the ball circuit in accordance with the structure described above. These include, the first end right hand helical power portion, the tunnels of the intermediate ball race leading to and from the open ball race portion of the intermediate ball race, the second end left hand end helical power portion, the second end ball deflector portion, the recirculation ball return portion and the first end ball deflector portion. The circumferential spacing of the ball races is shown in FIG. 3.

A plurality of balls 144 are seated in and substantially fill the length of the endless ball circuits to define six separate endless trains of balls. Since the first and second ball races of the body and sleeve portions are of opposite hand turn and have identical lead angel, the balls roll smoothly through the ball circuits at the same speed and no differential ball travel is realized which would cause ball scuffing. In alternative embodiments of the invention not shown, separate ball circuits may be used for the first body portion and the first sleeve portion, and for the second body portion and the second sleeve portion, thus allowing the use of the same hand turn races for both and the use of different lead angles. At least one of the first or second end ball circuits must be helical to produce relative rotational movement between the first and second body portions in response to axial movement of the pistons.

As the pistons 70 and 72, and the sleeve 58 in response thereto, linearly reciprocate between one or the other axial direction within the body cavity 32, as a result of fluid pressure selectively applied to the compartments 50 and 52, torque is transmitted by the balls 144 through the coaction of the interior helical first ball races 108 on the first body portion 34 with the exterior helical first ball races 112 on the first sleeve portion 58a. The transmitted torque causes the sleeve 58 to rotate as it moves axially. The resulting linear and rotational movement of the sleeve 58 is transmitted by the balls 144 through the coaction of the interior helical second ball races 110 on the second body portion 36 with the exterior helical second ball races 114 on the second sleeve portion 58b. The transmitted torque causes the second body portion 36 to rotate relative to the first body portion 34 since axial movement of the second body portion is restricted by the tie-rod 84 and end cap 88. As such, axial movement of the sleeve 58 is converted into relative rotational movement between the first and second body portions 34 and 36.

Figure 7:
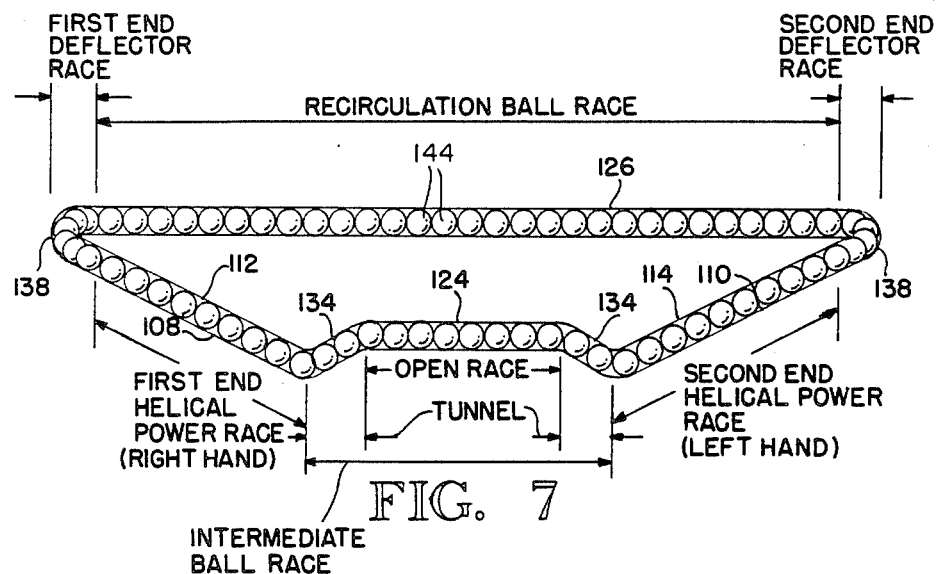
FIG. 7 is a schematic diagram of an endless ball circuit used in the actuator of FIG. 1 with the various lengthwise portions labeled.

As the sleeve 58 reciprocates, the balls 144 travel back and forth in the endless ball circuits. At any time, as shown in FIG. 7, some of the balls 144 may be in the first body and first sleeve portion ball races 108 and 116 to transmit torque between the first body portion 34 and the sleeves 58. By way of example, as the sleeve 58 moves from the end limit of its travel toward the first body end 26 toward the second body end 28, the balls will begin to circulate in the endless ball circuit. Since when free rolling the balls 144 will travel only one-half the distance of the sleeve, the balls effectively circulate with the opposite direction and start to enter the deflector ball race 138 of the first deflector 76. The balls are guided through a 180° turn and to the radially inward position recirculation ball race 126. At the same time, some of the balls in the recirculation ball race 126 will move out of he recirculation ball race into the deflector ball race 138 of the second deflector 80 and be guided through a 180° turn and to the second body and second sleeve portion ball races 110 and 114 to transmit torque between the sleeve 58 and the second body portion 36, producing the rotational output of the actuator 10.

As the sleeve moves, some of these balls will enter the ramped ball race portion 134 in the second sleeve portion 58b forming the tunnel to the intermediate ball race 124. While in the intermediate ball race 124, the balls travel freely out of the way of the inward end portions 38 and 40 of the first and second body portions 34 and 36 which are rotating relative to each other. The balls which are circulating out of the intermediate ball race 124 pass through the ramped ball race portion 134 in the first sleeve portion 58a forming the tunnel from the intermediate portion to the first body and first sleeve portion ball races 108 and 116. Thus, having described the journey of balls along the entire length of one endless ball circuit, it will be readily apparent that the direction of ball circulation will reverse when the sleeve has reached the end limit of its travel toward the first body end 26 and fluid pressure is applied to reverse the direction of travel of the sleeve. In FIG. 3, the lines with double headed arrows illustrate the placement of the ball races which form each of the six endless ball circuits.

Figure 8:
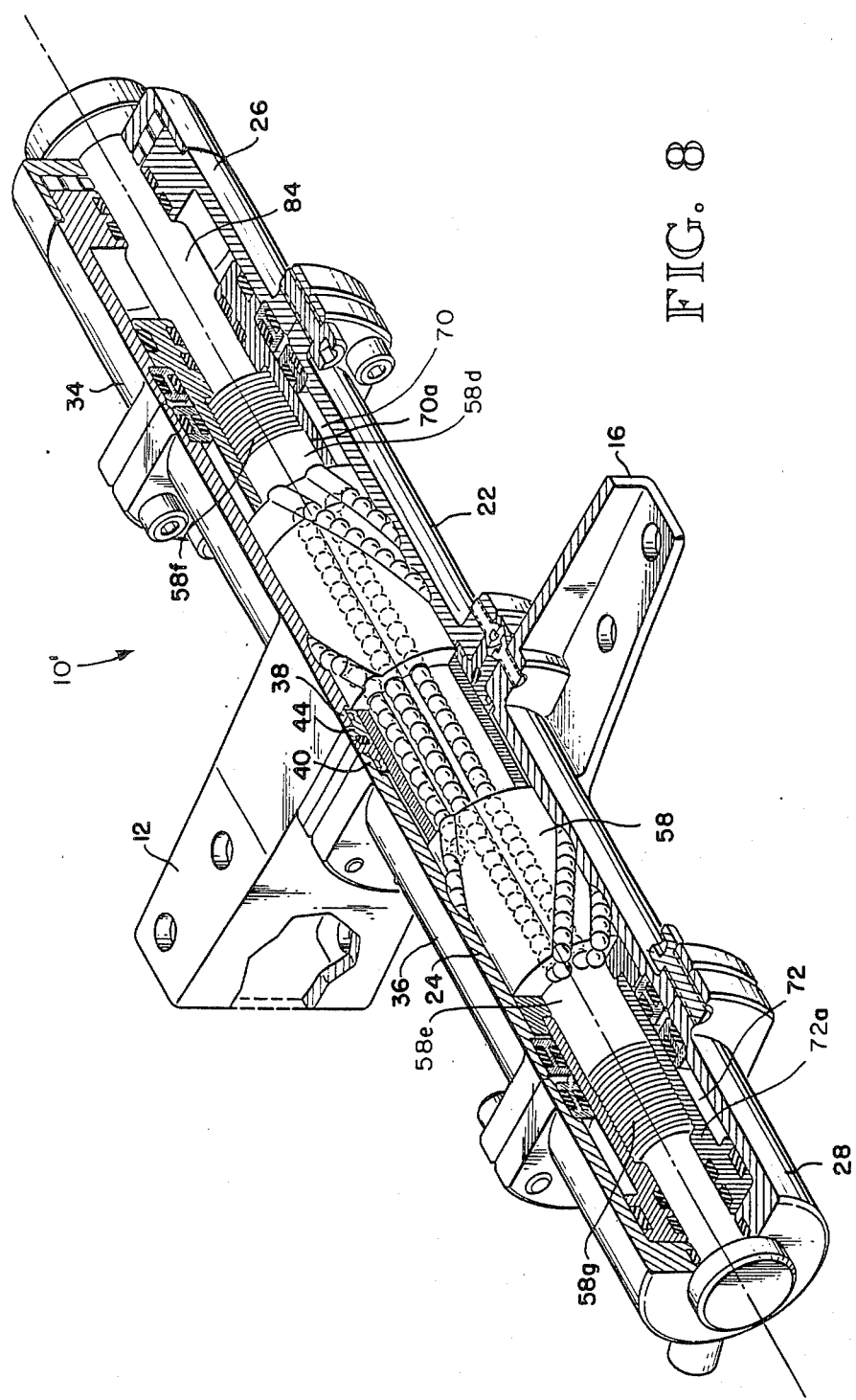
FIG. 8 is a sectional isometric view of an alternative embodiment of the invention.

An alternative embodiment of the actuator 10 is shown in FIG. 8 with the similar main components identified by the same reference numerals used for the embodiment of FIG. 1. In operation and structure, the two actuators are very similar. The actuator 10 in FIG. 8 is shown with a reversed orientation, but more significantly the pistons 70 and 72 are threadably attached to the sleeve mounting portions 58d and 58e using a threaded interior of the piston sleeve portions 70a and 72a mounted on the lengthened threaded end portions 58f and 58g of the sleeve 58. The tie-rod 84 is also fixed at its ends in a variant manner, and a different arrangement is used for the split bearings 44 between the inward end portions 38 and 40 of the first and second body portions 34 and 36.

It will be appreciated that, although specific embodiments of the invention have been described herein for purposes of illustration, various modification may be made without departing from the scope of the invention. Accordingly, the invention is not limited except by the appended claims.

I claim:

1. A fluid-powered rotary actuator for use in an aircraft to operate a flight control surface, comprising:
    an outer elongated body having first and second ends and a mid-portion therebetween, said body having an elongated generally cylindrical interior cavity extending generally between said first and second body ends, said body including an elongated stationary first end body portion extending from said first end to said body mid-portion and terminating thereat in an inward end portion, and an elongated second end body portion rotatable relative to said stationary first body portion and extending from said second end to said mid-portion and terminating in an inward end portion, said first and second body portions being in generally coaxial longitudinal alignment and said inward end portions of said first and second body portions being positioned in generally end-to-end relationship for rotation relative to each other, said first body portion having an interior generally cylindrical first end cavity therewithin forming a portion of said body cavity and said second body portion having an interior generally cylindrical second end cavity therewithin forming a portion of said body cavity, said first body portion having a torque-transmitting interior first helical ball race with a first hand turn, and said second body portion having a torque-transmitting interior second helical ball race with a second hand turn, said first and second body portion ball races having the same lead angle and said first and second hand turns being of the opposite hand, said body further including an exterior attachment arm rigidly connected to said first body portion at said inward end portion thereof for attachment either to the aircraft structure or the aircraft flight control surface, and an exterior attachment arm rigidly connected to said second body portion at said inward end portion thereof for attachment to the other of the aircraft structure or flight control surface to minimize axial separation of said attachment arms;

an elongated annular sleeve reciprocally and generally coaxially mounted within said body cavity and having a longitudinal central aperture extending fully therethrough, said sleeve having a first end sleeve portion positioned within said first cavity of said first body portion, a second end sleeve portion positioned within said second cavity of said second body portion, and an intermediate sleeve portion extending between said first and second sleeve portions and spanning said inward end portions of said first and second body portions, said first sleeve portion extending from an axially outward portion thereof located toward said first body end to said intermediate sleeve portion and said second sleeve portion extending from an axially outward portion thereof located toward said second body end to said intermediate sleeve portion, said first sleeve portion having a torque-transmitting exterior first helical ball race confronting and corresponding to said interior first ball race of said first body portion with said same first hand turn and lead angle, and second sleeve portion having a torque-transmitting exterior second helical ball race confronting and corresponding to said interior second ball race of said second body portion with said same second hand turn and lead angle, said intermediate sleeve portion having a sufficient longitudinal length to permit free end-to-end reciprocation of said sleeve within said body while said sleeve portion exterior first and second ball races coact with said body portion interior first and second ball races during actuator operation, said exterior first ball race of said first sleeve portion extending from an outward race end located toward said first sleeve portion outward portion to an inward race end located adjacent to said intermediate sleeve portion, and said exterior second ball race of said second sleeve portion extending from an outward race end located toward said second sleeve portion outward portion to an inward race end located adjacent to said intermediate sleeve portion, said intermediate sleeve portion having an intermediate ball race extending between and connecting together said inward race ends of said sleeve portion exterior first and second ball races for the passage of balls therebetween during actuator operation, said intermediate sleeve portion being positioned radially inward away from said body to maintain balls in said intermediate ball race out of torque-transmitting engagement with said body, said sleeve further having a recirculation ball race generally longitudinally extending between an outward race end located toward said first sleeve portion outward portion and an outward race end located toward said second sleeve portion outward portion, said recirculation ball race being positioned radially inward of said sleeve portion exterior first and second ball races and extending interiorly within the sleeve wall of said sleeve for at least the portion of its length coextensive with said first and second body portions;

a first ball deflector positioned at said first sleeve portion outward portion and having a deflector ball race extending between and connecting together said outward race ends of said first sleeve portion exterior first ball race and said recirculation ball race at said outward portion of said first sleeve portion for the passage of balls therebetween during actuator operation;

a second ball deflector positioned at said second sleeve portion outward portion and having a deflector ball race extending between and connecting together said outward race ends of said second sleeve portion exterior second ball race and said recirculation ball race at said outward portion of said second sleeve portion for the passage of balls therebetween during actuator operation, said first and second sleeve portion exterior first and second ball races, said intermediate sleeve portion intermediate ball race, said sleeve recirculation ball race and said first and second deflector ball races defining an endless ball circuit for ball circulation during actuator operation;

a piston reciprocally and generally coaxially mounted within said body cavity for application of fluid pressure thereon and operatively engaging said sleeve to produce reciprocal axial movement of said sleeve, said piston having a longitudinal central aperture extending fully therethrough;

a plurality of balls seated in and substantially filling the length of said endless ball circuit to define an endless train of balls; and a connecting member generally coaxially disposed within said body and extending through said central apertures of said sleeve and piston, said connecting member and said sleeve and piston apertures being radially sized to permit movement of said sleeve and piston substantially uninhibited along said connecting member, said connecting member extending between and connected to each of said first and second end body portions at locations axially outward of said piston and sleeve to connect together and maintain fixed the relative longitudinal positions of said first and second body portions against axial separation during actuator operation.

2. The actuator of claim 1 wherein at least a lengthwise portion of said intermediate ball race is an open ball race formed in the exterior of said recessed intermediate sleeve portion, and wherein at least a lengthwise portion of said recirculation ball race coextensive with said recessed intermediate sleeve portion is an open ball race formed in the exterior of said recessed intermediate sleeve portion, with the actuator further including a cover positioned within said body cavity and extending about said recessed intermediate sleeve portion radially outward of the balls in said open ball race lengthwise portions of said intermediate and recirculation ball races to maintain the balls in position within said open ball race lengthwise portions during actuator operation.

3. The actuator of claim 1 wherein at least a centrally located lengthwise portion of said intermediate ball race is an open ball race formed in the exterior of said recessed intermediate sleeve portion, and said intermediate ball race includes a ramped ball race portion at each outward end of said open ball race portion to guide balls between said open ball race portion and said exterior first and second ball races of said first and second sleeve portions.

4. The actuator of claim 3 wherein said ramped ball race portions are tunnels formed in said first and second sleeve portions 5. The actuator of claim 1 wherein first and second ball deflectors are each an annular member generally coaxially mounted within said body cavity each axially outward of one of said sleeve outward portions and having a longitudinal central aperture through which said connecting member extends, said annular member apertures being radially sized to permit movement of said annular members substantially uninhibited along said connecting member, said annular members being attached to said sleeve to prevent relative rotation therebetween, each said annular member having an end face with one of said deflector ball races formed therein, said end face being in juxtaposition with a corresponding axially outward end face of said first or second sleeve portion, said first or second deflector ball race being aligned with the corresponding ones of said outward race ends of said sleeve portion exterior first or second ball race and said recirculation ball race.

6. The actuator of claim 1 wherein said recirculation ball race is a substantially straight bore extending fully through the sleeve wall of said sleeve between an axially outward end face of said first sleeve portion and an axially outward end face of said second sleeve portion.

7. The actuator of claim 1 further including a first end cap at said body first end and a second end cap at said body second end, and wherein said connecting member includes a tie-rod centrally disposed within said body and extending end-to-end between said end caps through said central apertures of said sleeve and piston, said first and second end caps engaging said first and second body portions, respectively, and said tie-rod being connected to each of said first and second end caps to apply through said end caps an axially inward force on said first and second body portions to maintain the relative longitudinal positions of said first and second body portions against axial outward separation during actuator operation.

8. The actuator of claim 7 wherein said tie-rod includes adjustment means for adjustably applying a selected axially inward force on said first and second end caps.

9. The actuator of claim 8 wherein at least one of first or second end caps has a central aperture therethrough and said tie-rod extends through said end cap aperture, and wherein said adjustment means include a threaded end portion of said tie-rod on which a retaining nut is threadably mounted axially outward of said one end cap having said central aperture and in engagement therewith, said nut being rotatable to adjustably apply said axially inward force to said first and second end caps.

10. The actuator of claim 1 wherein at least one thrust bearing is positioned between said inward end portions of said first and second body portions to facilitate their relative rotation during actuator operation.

11. The actuator of claim 1 wherein said inward end portion of said first body portion is radially sized to receive therewithin against an engagement member said inward end portion of said second body portion, and the actuator further includes a thrust bearing positioned between said engagement member and said second body portion inward end portion to facilitate relative rotation between said first and second body portions during actuator operation.

12. The actuator of claim 1 wherein said sleeve has a piston mounting portion extending longitudinally outward beyond said axially outward portion of one of said first or second sleeve portions, and said piston is mounted on said sleeve mounting portion axially outward of said axially outward portion of said one sleeve portion, said piston and said sleeve mounting portion being connected together to maintain fixed the relative longitudinal positions of said piston and said sleeve during actuator operation.

13. The actuator of claim 12 wherein at least one of said first or second ball deflector corresponding to said one sleeve portion is an annular member positioned generally coaxially around said sleeve mounting portion in engagement with said axially outward portion of said one sleeve portion, and wherein said piston includes a piston sleeve portion and an annular piston head portion attached thereto, said piston sleeve portion being positioned generally coaxially around said sleeve mounting portion axially outward of said annular deflector member with an inward end portion thereof in engagement with said annular deflector member to maintain said annular deflector member in fixed longitudinal position relative to said one sleeve portion.

14. The actuator of claim 13 wherein said sleeve mounting portion extends longitudinally outward beyond said piston and has a threaded end portion on which a retaining nut is threadably mounted axially outward of said piston and in engagement therewith, said nut being rotatable to apply in axially inward force on said piston and maintain fixed the longitudinal positions of said piston and said annular deflector member relative to said one sleeve portion.

15. The actuator of claim 13 wherein said piston sleeve portion and said sleeve mounting portion are cooperatively threaded and threadably attached together to maintain fixed the longitudinal positions of said piston and said annular deflector member relative to said one sleeve portion.

16. A fluid-powered rotary actuator, comprising:
an outer elongated body having first and second ends and a mid-portion therebetween, said body having an elongated interior cavity extending generally between said first and second body ends, said body including a stationary first end body portion extending from said first end to said body mid-portion and terminating thereat in an inward end portion, and a second end body portion rotatable relative to said stationary first body portion and extending from said second end to said mid-portion and terminating in an inward end portion, said first and second body portions being in generally coaxial longitudinal alignment and said inward end portions of said first and second body portions being positioned in generally end-to-end relationship for rotation relative to each other, said first body portion having an interior first end cavity therewithin forming a portion of said body cavity and said second body portion having an interior second end cavity therewithin forming a portion of said body cavity, said first body portion having a torque-transmitting interior first helical ball race with a first hand turn, and said second body portion having a torque-transmitting interior second helical ball race with a second hand turn, said first and second body portion ball races having the same lead angle and said first and second hand turns being of the opposite hand, said body further including an exterior attachment arm rigidly connected to said first body portion at said inward end portion thereof for attachment either to a stationary structure or a movable member, and an exterior attachment arm rigidly connected to said second body portion at said inward end portion thereof for attachment to the other of the stationary structure or the movable member to minimize axial separation of said attachment arms;

an elongated annular sleeve reciprocally and generally coaxially mounted within said body cavity and having a longitudinal aperture extending fully therethrough, said sleeve having a first end sleeve portion positioned within said first cavity of said first body portion, a second end sleeve portion positioned within said second cavity of said second body portion, and an intermediate sleeve portion extending between said first and second sleeve portions and spanning said inward end portions of said first and second body portions, said first sleeve portion extending from an axially outward portion thereof located toward said first body end to said intermediate sleeve portion and said second sleeve portion extending from an axially outward portion thereof located toward said second body end to said intermediate sleeve portion, said first sleeve portion having a torque-transmitting exterior first helical ball race confronting and corresponding to said interior first ball race of said first body portion with said same first hand turn and lead angle, and second sleeve portion having a torque-transmitting exterior second helical ball race confronting and corresponding to said interior second ball race of said second body portion with said same second hand turn and lead angle, said intermediate sleeve portion having a sufficient longitudinal length to permit free end-to-end reciprocation of said sleeve within said body while said sleeve portion exterior first and second ball races coact with said body portion interior first and second ball races during actuator operation, said exterior first ball race of said first sleeve portion extending from an outward race end located toward said first sleeve portion outward portion to an inward race end located adjacent to said intermediate sleeve portion, and said exterior second ball race of said second sleeve portion extending from an outward race end located toward said second sleeve portion outward portion to an inward race end located adjacent to said intermediate sleeve portion, said intermediate sleeve portion having an intermediate ball race extending between and connecting together said inward race ends of said sleeve portion exterior first and second ball races for the passage of balls therebetween during actuator operation, said intermediate sleeve portion being positioned radially inward away from said body to maintain balls in said intermediate ball race out of torque-transmitting engagement with said body, said sleeve further having a recirculation ball race generally longitudinally extending between an outward race end located toward said first sleeve portion outward portion and an outward race end located toward said second sleeve portion outward portion, said recirculation ball race being positioned radially inward of said sleeve portion exterior first and second ball races;

a first ball deflector positioned at said first sleeve portion outward portion and having a deflector ball race extending between and connecting together said outward race ends of said first sleeve portion exterior first ball race and said recirculation ball race at said outward portion of said first sleeve portion for the passage of balls therebetween during actuator operation;

a second ball deflector positioned at said second sleeve portion outward portion and having a deflector ball race extending between and connecting together said outward race ends of said second sleeve portion exterior second ball face and said recirculation ball race at said outward portion of said second sleeve portion for the passage of balls therebetween during actuator operation, said first and second sleeve portion exterior first and second ball races, said intermediate sleeve portion intermediate ball race, said sleeve recirculation ball race and said first and second deflector ball races defining an endless ball circuit for ball circulation during actuator operation;

a piston reciprocally and generally coaxially mounted within said body cavity for application of fluid pressure thereon and operatively engaging said sleeve to produce reciprocal axial movement of said sleeve, said piston having a longitudinal aperture extending fully therethrough;

a plurality of balls seated in said endless ball circuit to define an endless train of balls; and a connecting member disposed within said body and extending through said apertures of said sleeve and piston, said connecting member and said sleeve and piston apertures being radially sized to permit movement of said sleeve and piston substantially uninhibited along said connecting member, said connecting member extending between and connected to each of said first and second end body portions to connect together and maintain fixed the relative longitudinal positions of said first and second body portions against axial separation during actuator operation 17. The actuator of claim 16 wherein at least a lengthwise portion of said intermediate ball race is an open ball race formed in the exterior of said recessed intermediate sleeve portion, and wherein at least a lengthwise portion of said recirculation ball race coextensive with said recessed intermediate sleeve portion is an open ball race formed in the exterior of said recessed intermediate sleeve portion, with the actuator further including a cover positioned within said body cavity and extending about said recessed intermediate sleeve portion radially outward of the balls in said open ball race lengthwise portions of said intermediate and recirculation ball races to maintain the balls in position within said open ball race lengthwise portions during actuator operation.

18. The actuator of claim 16 wherein at least a centrally located lengthwise portion of said intermediate ball race is an open ball race formed in the exterior of said recessed intermediate sleeve portion, and said intermediate ball race includes a ramped ball race portion at each outward end of said open ball race portion to guide balls between said open ball race portion and said exterior first and second ball races of said first and second sleeve portions.

19. The actuator of claim 18 wherein said ramped ball race portions are tunnels formed in said first and second sleeve portions 20. The actuator of claim 16 wherein first and second ball deflectors are generally coaxially mounted within said body cavity, each axially outward of one of said sleeve outward portions, each said ball deflector having a longitudinal aperture through which said connecting member extends, said ball deflector apertures being radially sized to permit movement of said ball deflectors substantially uninhibited along said connecting member, said ball deflectors being attached to said sleeve to prevent relative rotation therebetween, each said ball deflector having an end face with one of said deflector ball races formed therein, said end face being in juxtaposition with a corresponding axially outward end face of said first or second sleeve portion, said first or second deflector ball race being aligned with the corresponding ones of said outward race ends of said sleeve portion exterior first or second ball race and said recirculation ball race.

21. The actuator of claim 16 further including a first end member at said body first end and a second end member at said body second end, and wherein said connecting member includes a tie-rod disposed within said body and extending end-to-end between said end members through said apertures of said sleeve and piston, said first and second end members engaging said first and second body portions, respectively, and said tie-rod being connected to each of said first and second end members to apply through said end members an axially inward force on said first and second body portions to maintain the relative longitudinal positions of said first and second body portions against axial outward separation during actuator operation.

22. The actuator of claim 21 wherein said tie-rod includes adjustment means for adjustably applying a selected axially inward force on said first and second end caps.

23. The actuator of claim 22 wherein at least one of first or second end members has an aperture therethrough and said tie-rod extends through said end member aperture, and wherein said adjustment means includes a threaded end portion of said tie-rod on which a retaining nut is threadably mounted axially outward of said one end member having said aperture and in engagement therewith, said nut being rotatable to adjustably apply said axially inward force to said first and second end members.

24. The actuator of claim 16 wherein at least one thrust bearing is positioned between said inward end portions of said first and second body portions to facilitate their relative rotation during actuator operation.

25. The actuator of claim 16 wherein said inward end portion of said first body portion is radially sized to receive therewithin against an engagement member said inward end portion of said second body portion, and the actuator further includes a thrust bearing positioned between said engagement member and said second body portion inward end portion to facilitate relative rotation between said first and second body portions during actuator operation.

26. The actuator of claim 16 wherein said sleeve has a piston mounting portion extending longitudinally outward beyond said axially outward portion of one of said first or second sleeve portions, and said piston is mounted on said sleeve mounting portion axially outward of said axially outward portion of said one sleeve portion, said piston and said sleeve mounting portion being connected together to maintain fixed the relative longitudinal positions of said piston and said sleeve during actuator operation.

27. The actuator of claim 26 wherein at least one of said first or second ball deflector corresponding to said one sleeve portion is an annular member positioned generally coaxially around said sleeve mounting portion in engagement with said axially outward portion of said one sleeve portion, and wherein said piston includes a piston sleeve portion and an annular piston head portion attached thereto, said piston sleeve portion being positioned generally coaxially around said sleeve mounting portion axially outward of said annular deflector member with an inward end portion thereof in engagement with said annular deflector member to maintain said annular deflector member in fixed longitudinal position relative to said one sleeve portion.

28. The actuator of claim 27 wherein said sleeve mounting portion extends longitudinally outward beyond said piston and has a threaded end portion on which a retaining nut is threadably mounted axially outward of said piston and in engagement therewith, said nut being rotatable to apply an axially inward force on said piston and matinain fixed the longitudinal positions of said piston and said annular deflector member relative to said one sleeve portion.

29. The actuator of claim 27 wherein said piston sleeve portion and said sleeve mounting portion are cooperatively threaded and threadably attached together to maintain fixed the longitudinal positions of said piston and said annular deflector member relative to said one sleeve portion.

30. A fluid-powered rotary actuator for use in an aircraft to operate a flight control surface, comprising:
an outer elongated body having first and second ends and a mid-portion therebetween, said body having an elongated interior cavity extending generally between said first and second body ends, said body including a stationary first end body portion extending from said first end to said body mid-portion and terminating thereat in an inward end portion, and a second end body portion rotatable relative to said stationary first body portion and extending from said second end to said mid-portion and terminating in an inward end portion, said first and second body portions being in generally coaxial longitudinal alignment and said inward end portions of said first and second body portions being positioned in generally end-to-end relationship for rotation relative to each other, said first body portion having an interior first end cavity therewithin forming a portion of said body cavity and said second body portion having an interior second end cavity therewithin forming a portion of said body cavity, said first body portion having torque-transmitting interior first grooves, and said second body portion having torque-tansmitting interior second grooves, said body further including an exterior attachment arm rigidly connected to said first body portion at said inward end portion thereof for attachment either to the aircraft structure or the aircraft flight control surface, and an exterior attachment arm rigidly connected to said second body portion at said inward end portion thereof for attachment to the other of the aircraft structure or flight control surface to minimize axial separation of said attachment arms;

an elongated annular sleeve reciprocally and generally coaxially mounted within said body cavity and having a longitudinal aperture extending fully therethrough, said sleeve having a first end sleeve portion positioned within said first cavity of said first body portion, a second end sleeve portion positioned within said second cavity of said second body portion, and an intermediate sleeve portion extending between said first and second sleeve portions and spanning said inward end portions of said first and second body portions, said first sleeve portion extending from an axially outward portion thereof located toward said first body end to said intermediate sleeve portion and said second sleeve portion extending from an axially outward portion thereof located toward said second body end to said intermediate sleeve portion, said first sleeve portion having torque-transmitting exterior first grooves confronting and corresponding to said interior first grooves of said first body portion for coacting therewith to transmit torque between said sleeve and said first body portion, and second sleeve portion having torque-transmitting exterior second grooves confronting and corresponding to said interior second grooves of said second body portion for coaction therewith to transmit torque between said sleeve and said second body portion, at least said first grooves or said second grooves being helical to produce relative rotational movement between said body and said sleeve in response to axial movement of said sleeve, said intermediate sleeve portion having a sufficient longitudinal length to permit free end-to-end axial reciprocation of said sleeve within said body while said sleeve portion exterior first and second grooves coact with said body portion interior first and second grooves during actuator operation;

a piston reciprocally and generally coaxially mounted within said body cavity for application of fluid pressure thereon and operatively engaging said sleeve to produce reciprocal axial movement of said sleeve, said piston having a longitudinal aperture extending fully therethrough; and a connecting member disposed within said body and extending through said apertures of said sleeve and piston, said connecting member and said sleeve and piston apertures being radially sized to permit movement of said sleeve and piston substantially uninhibited along said connecting member, said connecting member extending between and connected to each of said first and second end body portions to connect together and maintain fixed the relative longitudinal positions of said first and second body portions against axial separation during actuator operation.

31. The actuator of claim 30 further including a first end member at said body first end and a second end member at said body second end, and wherein said connecting member includes a tie-rod disposed within said body and extending end-to-end between said end members through said apertures of said sleeve and piston, said first and second end members engaging said first and second body portions, respectively, and said tie-rod being connected to each of said first and second end members to apply through said end members an axially inward force on said first and second body portions to maintain the relative longitudinal positions of said first and second body portions against axial outward separation during actuator operation.

32. The actuator of claim 32 wherein said tie-rod includes adjustment means for adjustably applying a selected axially inward force on said first and second end caps.

33. The actuator of claim 32 wherein at least one of first or second end members has an aperture therethrough and said tie-rod extends through said end member aperture, and wherein said adjustment means includes a threaded end portion of said tie-rod on which a retaining nut is threadably mounted axially outward of said one end member having said aperture and in engagement therewith, said nut being rotatable to adjustably apply said axially inward force to said first and second end members.

34. The actuator of claim 30 wherein at least one thrust bearing is positioned between said inward end portions of said first and second body portions to facilitate their relative rotation during actuator operation.

35. The actuator of claim 30 wherein said inward end portion of said first body portion is radially sized to receive therewithin against an engagement member said inward end portion of said second body portion, and the actuator further includes a thrust bearing positioned between said engagement member and said second body portion inward end portion to facilitate relative rotation between said first and second body portions during actuator operation.

36. The actuator of claim 30 wherein said sleeve has a piston mounting portion extending longitudinally outward beyond said axially outward portion of one of said first or second sleeve portions, and said piston is mounted on said sleeve mounting portion axially outward of said axially outward portion of said one sleeve portion, said piston and said sleeve mounting portion being connected together to maintain fixed the relative longitudinal positions of said piston and said sleeve during actuator operation.

* * * * *

UNITED STATES PATENT AND TRADEMARK OFFICE
CERTIFICATE OF CORRECTION

PATENT NO. : 4,738,415

DATED : April 19, 1988

INVENTOR(S) : Paul P. Weyer

It is certified that error appears in the above-identified patent and that said Letters Patent is hereby corrected as shown below:

Claim 16, column 18, line 30, delete "face" and substitute therefor --race--.

Claim 28, line 7, delete "matinain" and substitute therefor --maintain--.

Claim 30, column 21, line 5, delete "tansmitting" and substitute therefor --transmitting--.

Claim 32, line 1, delete "32" and substitute therefor --31--.

Signed and Sealed this

Fifteenth Day of November, 1988

Attest:

DONALD J. QUIGG

*Attesting Officer*   *Commissioner of Patents and Trademarks*